July 3, 1945. B. M. HYMAN 2,379,803
HARVESTER
Filed Oct. 30, 1942 2 Sheets-Sheet 2
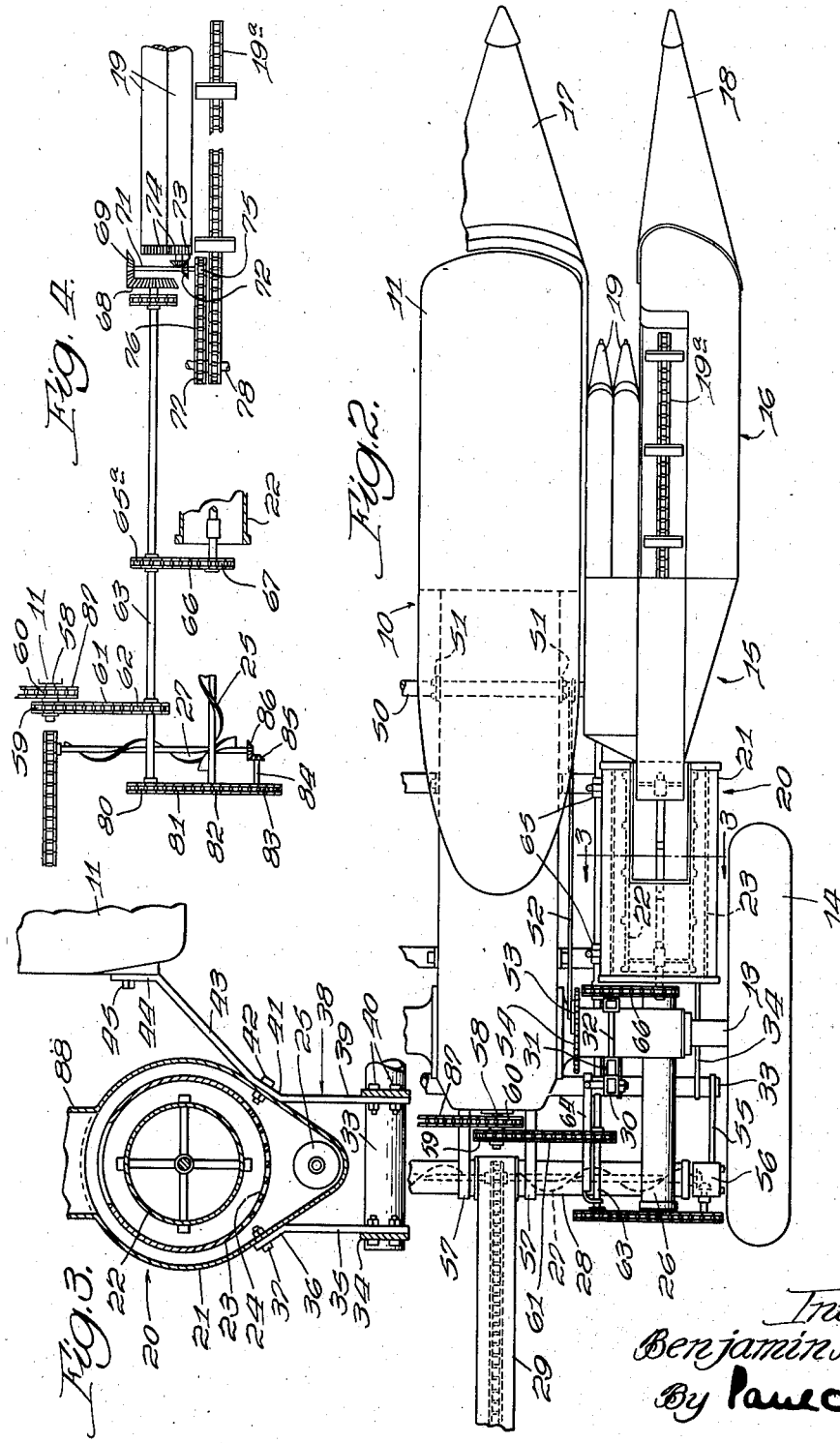
Inventor:
Benjamin M. Hyman
By Paul O. Pippel
Atty.

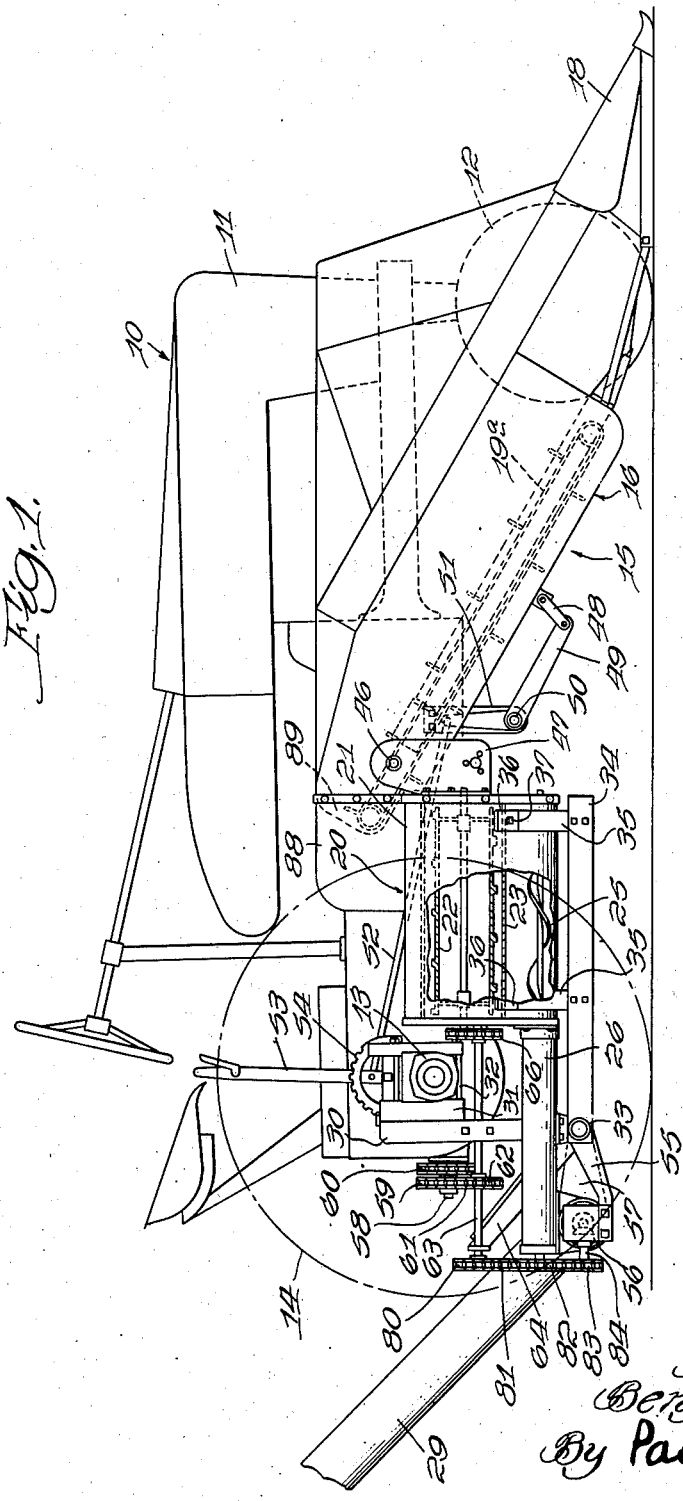

Patented July 3, 1945

2,379,803

UNITED STATES PATENT OFFICE 2,379,803

HARVESTER

Benjamin M. Hyman, Moline, Ill., assignor to International Harvester Company, a corporation of New Jersey Application October 30, 1942, Serial No. 463,929

9 Claims. (Cl. 56—18)

This invention relates to a harvester. More particularly it relates to a tractor-mounted picker sheller.

One great difficulty with tractor-mounted corn harvesters lies in the fact that a considerable portion of the harvester extends across the rear axle of the tractor upon which the harvester is mounted, and the harvester thereby becomes difficult to attach to and detach from the tractor. Corn harvesters are known which include a shelling unit in place of a husking unit, but very little work has been done in the mounting of these harvesters composed of a snapping or gathering unit and a shelling unit upon a tractor. One way of solving the problem of attaching to and detaching a tractor-mounted corn picker is to place beneath the rear axle of the tractor that part of the picker which extends from in front of the rear axle to the rear of the rear axle. Applicant has discovered that this arrangement is facilitated by the substitution of a shelling unit for a husking unit, since the shelling unit has less length and therefore need not extend across the tractor axle, and a conveyer for shelled corn leading from the shelling unit may be easily positioned beneath the tractor axle.

An object of the present invention is to provide an improved harvester.

A further object is to provide an improved tractor-mounted corn harvester.

Another object is to provide an improved tractor-mounted picker sheller.

Still another object is the provision of an improved tractor-mounted corn harvester of the type by which corn is conveyed beneath the rear axle of the tractor.

Other objects will appear from the disclosure.

According to the present invention, a snapping unit is positioned at the side of a tractor body adjacent the front thereof, and a shelling unit is positioned directly behind the snapping unit and in front of the tractor rear axle. A conveyer for shelled corn extends from beneath the shelling unit rearwardly beneath the rear axle to the rear of the tractor.

In the drawings:

Figure 1 is a side view showing the picker sheller of the present invention mounted upon the tractor;

Figure 2 is a plan view of the structure shown in Figure 1 with certain parts omitted and certain parts broken away;

Figure 3 is a sectional view taken on the line 3—3 of Figure 2; and

Figure 4 is a diagrammatic view of the drive of the picker sheller of the present invention.

Reference character 10 designates a tractor having a narrow body 11, a narrow front rolling support 12, a rear axle 13, and rear wheels 14 of which only one is shown. Mounted upon the tractor 10 is a corn harvester composed of harvesting units 15 positioned at opposite sides of the tractor body 10, only the unit 15 at the right side of the tractor being shown since the other unit is identical with it. The unit 15 shown includes a snapping unit 16 which comprises a central divider point 17 positioned across the front of the tractor body 11, a side divider point 18, a pair of snapping rolls 19, and an ear elevator 19a. Positioned rearward of the snapping unit 16 is a shelling unit 20 comprising a casing 21, a shelling cylinder 22 within the casing, and a cylindrical member 23 surrounding the cylinder 22 and having a sieve portion 24 at its bottom. Below the cylinder 22 and the sieve portion 24 is an auger feed 25 which extends the length of the cylinder 22 and rearwardly thereof through a cylindrical shell 26 beneath the rear axle 13 to a point well to the rear of the rear axle. Located beneath the rear end of the auger feed 25 and its shell 26 is a transverse auger feed 27 and a shell 28 containing the auger feed. The auger feed 27 and the shell 28 extend from a point adjacent the wheel 14 to a wagon elevator 29 extending rearwardly from the tractor along its longitudinal center line.

A pair of vertical supporting members 30 depend from the rear side of the axle 13, only one member 30 being shown. The member 30 is secured to a channel 31 secured to the rear side of the rear axle by bolts 32. The vertical supporting members 30 carry at their lower end a transverse tube 33 which extends from adjacent one tractor wheel 14 to adjacent the other wheel. Secured to the tube 33 between the wheel 14 and the tractor body 11 is a pair of spaced longitudinal members 34 extending forwardly from the tube 33. A pair of members 35 are secured to and extend upwardly from the longitudinal member 34 adjacent the wheel 14. They have bent portions 36 at their upper end which are secured to the casing 21 of the shelling unit 20 by bolts 37. To the longitudinal member 34 adjacent the tractor body 11 is secured a pair of members 38, only one of which is shown as in Figure 3. Each member 38 has a vertical lower portion 39 secured by bolts 40 to the inner longitudinal member 34, a short intermediate portion 41 extending at an angle to the vertical portion 38 and secured by a bolt 42 to the shell 21, and an upper sloping portion 43 extending at a greater angle to the vertical portion 29 toward the tractor body 11 and having a vertical end portion 44 secured by a bolt 45 to the tractor body 11. The snapping unit 16 is pivotally mounted at 46 upon a forward extension 47 of the shelling unit 20 and is connected at a mid-point to a short link 48 in turn connected to one arm of a bell-crank 49 secured to a transverse shaft 50 extending across and beneath the tractor body 11 and supported in brackets 51 depending from opposite sides of the body 11. A link 52 connects the bell-crank 49 with a detent lever 53 pivotally mounted on the tractor over the rear axle and fixable to an arcuate dentate member 54. Adjustment of the lever 53 acts through the link 52, the bell-crank 49, and the link 48 to raise and lower the snapping unit 16 by pivotal movement about the pivot 46 on the forward extension 47 of the shelling unit 20.

A member 55 secured to the end of the transverse pipe 33 adjacent the tractor wheel 14 extends rearwardly from the pipe and supports at its rearward end a gear box 56 in which is rotatably mounted and supported the outer end of the auger 27. There is a similar arrangement, not shown, for corresponding parts at the other side of the tractor. Secured to the transverse pipe and extending rearwardly therefrom are supporting pieces 57, which embrace the shells 28 for the auger feeds 27 and provide supports for the shells and the lower end of the wagon elevator 29.

Figure 4 is a schematic showing of the drive for the various parts of the picker sheller. A power take-off shaft 58 extending from the rear of the tractor body 11 carries sprockets 59 60. A chain 61 engages the sprocket 59 and a sprocket 62 upon a longitudinally extending shaft 63 carried at its rear end by a member 64 secured to and extending upwardly and rearwardly from the transverse pipe 33 and toward its forward end by bearings 65 secured to the shell 21 as shown in Figure 2. Secured to an intermediate portion of the shaft 64 is a sprocket 65a engaged by a chain 66 in turn engaging a sprocket 67 driving the shelling cylinder 22. The forward end of the shaft 63 carries a bevel gear 68 engaging a bevel gear 69 secured to a shaft 71 carrying a bevel gear 72 engaging a bevel gear 73 secured to one snapping roll 19. Gear sections 74 and 74a on the rear ends of the snapping rolls 19 connect them for driving. A sprocket 75 secured to the shaft 71 is engaged by a chain 76, which engages a sprocket 77 secured to a shaft 78 driving the ear elevator 19a. The rear end of the shaft 63 carries a sprocket 80 engaged by a chain 81 engaging a sprocket 82 which is secured to the auger feed 25. The chain 81 engages a sprocket 83 secured upon a shaft 84 secured to a bevel gear 85 meshing with a bevel gear 86 secured to the auger feed 27. A chain 87 engages the sprocket 60 on the power take-off shaft 58 and provides drive for the picker sheller unit, not shown, at the left side of the tractor in the same way that the chain 61 provides drive for the picker sheller unit shown at the right side of the tractor.

In operation of the picker sheller, the tractor 10 is driven through a field of corn so that the snapping units at the opposite sides of the tractor move along adjacent rows of corn. As to the unit 15 at the right side of the tractor, the snapping rolls 19 snap ears from the stalks, and the ear elevator 19a conveys the ears snapped upwardly and rearwardly and discharges them into a hood 88 providing an entrance for the gears into the shelling unit 20. It will be noted that the very rear end of the snapping unit 16, indicated by the reference character 89, extends into the hood 88.

It will be understood from the foregoing description that a new and novel harvester construction has been provided. The construction is novel in that it includes a picker sheller combination mounted upon a tractor in such a way that the sheller is rigidly mounted and is positioned directly in front of the tractor axle. The construction is also novel in that it includes no structure that extends across the rear axle of the tractor, for the corn is conveyed from in front of the axle to in rear of the axle in shelled form by means of the conveyor which extends from beneath the shelling unit rearwardly beneath the rear axle to the rear of the rear axle. It will be readily appreciated that by virtue of the fact that there is no harvester structure extending over the rear axle of the tractor, the problem of removal of the harvester from the tractor is considerably simplified, for the harvester need only be detached from the tractor and lowered to the ground since the rear axle will not prevent this action. By the substitution of a shelling unit for a husking unit a considerable reduction in the overall lengths of the means which operates upon the corn snapped by the snapping rolls, is effected. Thus, this means, or in other words the shelling unit, being relatively short in length as compared with the husking units, is positioned entirely in front of the tractor rear axle. This arrangement simplifies removal of the harvester from the tractor.

The intention is to limit the invention only within the scope of the appended claims.

What is claimed is:

1. In combination with tractor having a rear axle, means for gathering corn, means mounting the gathering means upon the tractor, means adjacent said gathering means for shelling corn, means mounting the shelling means upon the tractor, means for conveying shelled corn from the shelling means beneath the rear axle from one side thereof to the other side, and means mounting the conveying means upon the tractor.

2. In combination with tractor having a rear axle, means for gathering corn, means mounting the gathering means upon the tractor, means adjacent said gathering means for shelling corn gathered by the gathering means, means mounting the shelling means upon the tractor, means for conveying corn shelled by the shelling means beneath the rear axle of the tractor from one side of the axle to the other side thereof.

3. In combination with tractor having a rear axle, means for gathering corn positioned forward of the rear axle, means mounting the gathering means upon the tractor, means for shelling corn positioned forward of the rear axle, means mounting the shelling means upon the tractor, means for conveying shelled corn from the shelling means beneath the rear axle to the rear thereof, and means mounting the shelling means upon the tractor.

4. In combination with tractor having a rear axle, means for gathering corn positioned adjacent the front of the tractor, means mounting the gathering means upon the tractor, shelling means positioned forward of the rear axle of the tractor and rearward of the gathering means and in general longitudinal alinement therewith, means mounting the shelling means upon the tractor, means for conveying shelled corn from the shelling means beneath the rear axle to the rear of the rear axle, and means mounting the conveying means upon the tractor.

5. In combination with tractor having a rear axle, means for gathering corn positioned near the front of the tractor, means mounting the gathering means upon the tractor, means for shelling corn positioned directly in front of the rear axle at approximately the level thereof, and means mounting the shelling means upon the tractor.

6. In combination with tractor having a rear axle, gathering means for corn positioned adjacent the front of the tractor, means mounting the gathering means upon the tractor, means for shelling corn gathered by the gathering means positioned in front of the rear axle at approximately the level thereof, means mounting the shelling means upon the tractor, conveying means extending from a point beneath the shelling means in front of the rear axle rearwardly beneath the rear axle to a point at the rear thereof, and means mounting the conveying means upon the tractor.

7. In combination with tractor having a rear axle, means for gathering corn positioned near the front of the tractor, means mounting the gathering means upon the tractor, a shelling cylinder positioned directly in front of the rear axle at approximately the level thereof and extending longitudinally of the tractor in general longitudinal alinement with the gathering means, means mounting the shelling cylinder upon the tractor, a conveyer for shelled corn extending from a point beneath the shelling cylinder in front of the rear axle rearwardly beneath the rear axle to a point at the rear thereof, and means mounting the conveyer upon the tractor.

8. In combination with tractor having a rear axle, means for gathering corn positioned adjacent the front of the tractor, means adjustably mounting the gathering means upon the tractor, means for shelling corn gathered by the gathering means positioned forward of the rear axle at approximately the level thereof and rearward of the gathering means in general longitudinal alinement therewith, means fixedly mounting the shelling means upon the tractor, a conveyer for shelled corn extending from a point beneath the shelling means in front of the rear axle rearwardly beneath the rear axle to a point at the rear thereof, and means mounting the conveyer upon the tractor.

9. In combination with a tractor having a rear axle, means for gathering corn positioned near the front of the tractor, means mounting the gathering means upon the tractor, a shelling cylinder positioned directly in front of the rear axle at approximately the level thereof and extending longitudinally of the tractor in general longitudinal alinement with the gathering means, means mounting the shelling cylinder upon the tractor, a conveyer for shelled corn extending longitudinally from a point beneath and in line with the shelling cylinder rearwardly beneath the rear axle to a point at the rear thereof, and means mounting the conveyer upon the tractor.

BENJAMIN M. HYMAN.